US010625817B2

(12) United States Patent
Kishita et al.

(10) Patent No.: US 10,625,817 B2
(45) Date of Patent: Apr. 21, 2020

(54) ELECTRICALLY POWER ASSISTED BICYCLE WITH AMBIENT LIGHT CONTROLLED HEADLIGHT

(71) Applicant: YAMAHA HATSUDOKI KABUSHIKI KAISHA, Iwata-shi, Shizuoka (JP)

(72) Inventors: Hirokatsu Kishita, Shizuoka (JP); Satoshi Katayama, Shizuoka (JP); Toshio Koga, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 162 days.

(21) Appl. No.: 15/704,111

(22) Filed: Sep. 14, 2017

(65) Prior Publication Data

US 2018/0072377 A1   Mar. 15, 2018

(30) Foreign Application Priority Data

Sep. 15, 2016  (JP) .................................. 2016-180400

(51) Int. Cl.
*B62M 6/50*       (2010.01)
*B62J 6/00*       (2020.01)
(Continued)

(52) U.S. Cl.
CPC ................. *B62M 6/50* (2013.01); *B62J 6/00* (2013.01); *B62J 6/02* (2013.01); *B62J 6/16* (2013.01);
(Continued)

(58) Field of Classification Search
CPC ... F21V 23/0442; B62M 6/50; B62J 6/00–16; H05B 37/0218; G01J 1/4204;
(Continued)

(56) References Cited

U.S. PATENT DOCUMENTS 4,672,206 A * 6/1987 Suzuki ................. G08B 13/193
                                                  250/342
6,204,752 B1 * 3/2001 Kishimoto ............... B62J 99/00
                                                  340/432
(Continued)

FOREIGN PATENT DOCUMENTS

CN        1304850 A       7/2001
CN        1410317 A       4/2003
(Continued)

*Primary Examiner* — Anh T Mai
*Assistant Examiner* — Michael Chiang
(74) *Attorney, Agent, or Firm* — Keating and Bennett, LLP

(57) ABSTRACT

An electrically power assisted bicycle includes an electric motor that generates an assist force assisting human power of a rider, a detachable battery that supplies electric power to the electric motor, a headlight, and an operation panel including a display that displays information, a power button that turns on or off the electrically power assisted bicycle, an illuminance sensor that outputs a signal in accordance with received light, and a controller configured or programmed to control the headlight to be on or off. The power button and the illuminance sensor are located close to each other on or in the operation panel. After a predetermined time period passes after the controller is activated by the power button being pressed by the rider, the controller starts controlling the headlight to be on or off in accordance with the signal output by the illuminance sensor.

10 Claims, 11 Drawing Sheets

(51) Int. Cl.

| | |
|---|---|
| *B62M 6/40* | (2010.01) |
| *H05B 47/11* | (2020.01) |
| *F21V 23/04* | (2006.01) |
| *B62J 6/02* | (2020.01) |
| *B62J 6/16* | (2020.01) |
| *B62J 99/00* | (2020.01) |
| *B62M 9/122* | (2010.01) |
| *G01J 1/42* | (2006.01) |
| *B62J 1/16* | (2006.01) |
| *B62M 6/55* | (2010.01) |
| *B62M 6/90* | (2010.01) |
| *B62M 9/126* | (2010.01) |

(52) U.S. Cl.
CPC ............... *B62J 99/00* (2013.01); *B62M 6/40* (2013.01); *B62M 9/122* (2013.01); *F21V 23/0464* (2013.01); *G01J 1/4204* (2013.01); *H05B 47/11* (2020.01); *B62J 1/165* (2013.01); *B62J 2099/002* (2013.01); *B62J 2099/0013* (2013.01); *B62J 2099/0033* (2013.01); *B62M 6/55* (2013.01); *B62M 6/90* (2013.01); *B62M 9/126* (2013.01); *G01J 2001/4266* (2013.01)

(58) Field of Classification Search
CPC .... B62H 2009/0013; B62H 2009/0026; B62H 2009/0033

USPC .............................................. 362/23.02, 642
See application file for complete search history.

(56) References Cited

U.S. PATENT DOCUMENTS

| | | | |
|---|---|---|---|
| 6,959,941 B2 | 11/2005 | Takeda et al. | |
| 2004/0036585 A1* | 2/2004 | Kitamura | B62J 6/001 |
| | | | 340/432 |
| 2004/0189722 A1 | 9/2004 | Acres | |
| 2014/0176021 A1* | 6/2014 | Fung | F21V 23/0435 |
| | | | 315/360 |
| 2018/0063927 A1* | 3/2018 | Abraham | H05B 37/0272 |

FOREIGN PATENT DOCUMENTS

| | | | |
|---|---|---|---|
| CN | 102009624 A | 4/2011 | |
| CN | 102219042 A | 10/2011 | |
| CN | 103287543 A | 9/2013 | |
| CN | 103359250 A | 10/2013 | |
| CN | 103979012 A | 8/2014 | |
| EP | 1 298 050 A1 | 4/2003 | |
| EP | 2 631 165 A1 | 8/2013 | |
| EP | 2 644 492 A1 | 10/2013 | |
| EP | 2 868 563 A1 | 5/2015 | |
| EP | 2868563 A1 * | 5/2015 | ............ B62M 6/70 |
| JP | 09-226664 A | 9/1997 | |

* cited by examiner

ELECTRICALLY POWER ASSISTED BICYCLE WITH AMBIENT LIGHT CONTROLLED HEADLIGHT

CROSS REFERENCE TO RELATED APPLICATIONS

This application claims the benefit of priority to Japanese Patent Application No. 2016-180400 filed on Sep. 15, 2016. The entire contents of this application are hereby incorporated herein by reference.

BACKGROUND OF THE INVENTION

1. Field of the Invention

The present invention relates to an electrically power assisted bicycle including an operation panel.

2. Description of the Related Art

An electrically power assisted bicycle that assists a force of a rider pushing pedals with an electric motor is known (see, for example, Japanese Laid-Open Patent Publication No. 09-226664). Such an electrically power assisted bicycle generates, in an electric motor, a driving force in accordance with human power applied to the pedals by the rider, so as to decrease the load imposed on the rider while, for example, the electrically power assisted bicycle is running on a slope or carrying a load.

An operation panel including a plurality of buttons that accept an input operation made by the rider is provided in the vicinity of a grip of a handle of the electrically power assisted bicycle. There is a type of operation panel that includes a liquid crystal panel and allows various types of information to be displayed on the liquid crystal panel. There is another type of operation panel that includes an optical sensor that is used to control a headlight to be on or off.

In order to increase the amount of information that can be displayed on the liquid crystal panel or to improve the visibility of the displayed information, it is desirable that the liquid crystal panel included in the operation panel has a large size. However, in order to include such a large liquid crystal panel, the operation panel needs to have a space in which the large liquid crystal panel is located. In order to include an optical sensor, the operation panel needs to have a space in which the optical sensor is located such that light from an area around the electrically power assisted bicycle is incident on the optical sensor.

In the meantime, the operation panel is attached to the handle, and it is desirable that a portion of the operation panel that protrudes from the handle is as small as possible. Therefore, the housing of the operation panel is required not to be large. It is also required that operating the buttons on or in the operation panel should be easy for the rider.

In the case where the operation panel includes a large liquid crystal panel, there is a restriction on the locations of the buttons and the optical sensor. In the case where the buttons and the optical sensor are located close to each other in a limited space, the rider's finger that is operating one of the buttons may block the light advancing toward the optical sensor. In such a case, the headlight may be inadvertently turned on.

SUMMARY OF THE INVENTION

Preferred embodiments of the present invention provide electrically power assisted bicycles that prevent a headlight from being unnecessarily turned on due to light advancing toward an optical sensor being blocked by a finger of the rider operating a button on an operation panel.

An electrically power assisted bicycle according to a preferred embodiment of the present invention includes an electric motor that generates an assist force to assist human power of a rider; a battery that supplies electric power to the electric motor; a headlight; and an operation panel including a display that displays information, a power button that turns on or off the electrically power assisted bicycle, an optical sensor that outputs a signal in accordance with received light, and a controller configured or programmed to control the headlight to be on or off. The power button and the optical sensor are located close to each other in the operation panel; and after a predetermined time period passes after the controller is activated by the power button being pressed by the rider, the controller is configured or programmed to start controlling the headlight to be on or off in accordance with the signal output by the optical sensor.

In the case where the power button and the optical sensor are located close to each other in the operation panel, a finger operating the power button may block light advancing toward the optical sensor. According to a preferred embodiment of the present invention, after a predetermined time period passes after the controller is activated by the power button being pressed by the rider, the control of the headlight to be on or off is started. Namely, the control of the headlight to be on or off is not started until a predetermined time period passes after the controller is activated by the power button being pressed by the rider. During the predetermined time period, a finger used to operate the power button may move away from the area in the vicinity of the power button and the optical sensor. Thus, the headlight is prevented from being turned on due to light advancing toward the optical sensor being blocked by the finger operating the power button.

In a preferred embodiment of the present invention, the predetermined time period is preferably about 1 second or longer and shorter than about 3 seconds, for example. Thus, the headlight is significantly reduced or prevented from being turned on due to the light advancing toward the optical sensor being blocked by the finger operating the power button. In addition, the control of the headlight to be on or off is started at an appropriate time.

In a preferred embodiment of the present invention, the predetermined time period is preferably about 1.5 seconds, for example. Thus, the headlight is significantly reduced or prevented from being turned on due to the light advancing toward the optical sensor being blocked by the finger operating the power button. In addition, the control of the headlight to be on or off is started at an appropriate time.

In a preferred embodiment of the present invention, the operation panel may include a clock; and the controller is configured or programmed to change the length of the predetermined time period in accordance with the time of activation thereof. The length of the predetermined time period may be changed in accordance with whether the time of activation is a time of day when it is desirable to turn on the headlight quickly or is a time of day when it is not necessarily desirable, so that the control of the headlight to be on or off is started at an appropriate time.

In a preferred embodiment of the present invention, the operation panel may include a clock; and the controller is configured or programmed to change the length of the predetermined time period in accordance with a time slot including the time of activation thereof. The length of the predetermined time period may be changed in accordance with whether the time of activation is in a time slot when it is desirable to turn on the headlight quickly or in a time slot when it is not necessarily desirable. For example, the length of the predetermined time period is changed whether the time of activation is at night when it is desirable to turn on the headlight quickly or during the day when it is not necessarily desirable. Thus, the control of the headlight to be on or off is started at an appropriate time.

In a preferred embodiment of the present invention, the controller is configured or programmed to calculate dates; and the controller is configured or programmed to change the length of the predetermined time period in accordance with the date when the controller is activated. In consideration that sunshine duration varies in accordance with the season, the length of the predetermined time period is changed in accordance with, for example, whether the controller is activated on a winter day or a summer day. Thus, the control of the headlight to be on or off is started at an appropriate time.

In a preferred embodiment of the present invention, in the case where the power button is kept on when the controller is activated by the power button being pressed by the rider, after the predetermined time period passes after the power button is released from the press, the controller is configured or programmed to start controlling the headlight to be on or off in accordance with the signal output by the optical sensor. The time period required to move a finger away after the finger presses the power button varies in accordance with the individual rider. In the case where the finger keeps pressing the power button even after the controller is activated, the finger may possibly block the light advancing toward the optical sensor when the controller starts controlling the headlight to be on or off. Therefore, the control of the headlight to be on or off is started after a predetermined time period passes after the power button is released from being pressed. In this manner, the headlight is significantly reduced or prevented from being turned on due to the light advancing toward the optical sensor being blocked by the finger.

In a preferred embodiment of the present invention, the electrically power assisted bicycle may further include a handle including a left grip and a right grip to be held by a rider. The operation panel may be located to the left of the handle. The operation panel may further include an assist force setting button that sets an assist force of the electric motor; a switch button that switches information on a running state of the electrically power assisted bicycle to be displayed on the display; and a light button that turns on or off the headlight. The assist force setting button, the switch button, the light button, the power button, and the optical sensor are preferably located in the operation panel, in this order, from a position closer to the left grip to a position farther away from the left grip.

Buttons used more frequently are located closer to the left grip. Thus, the degree with which the rider's hand is away from the grip that operates the operation panel is low.

The power button is preferably located far from the left grip. Thus, the possibility that the rider inadvertently presses the power button while operating any other button is significantly reduced or prevented.

The optical sensor is preferably located the farthest from the left grip. Thus, the possibility that the rider has his/her finger block the light from being incident on the optical sensor while operating any other button is significantly reduced or prevented.

In a preferred embodiment of the present invention, the operation panel may further include a single printed circuit board; and the display, the assist force setting button, the switch button, the light button, the power button, the optical sensor, and the controller are preferably located on the single printed circuit board.

The display, the buttons, the optical sensor, and the controller are located on the same printed circuit board so that the operation panel is thin. The line pattern of the printed circuit board is used to electrically connect the components to each other, so that line disconnection is significantly reduced or prevented and thus the reliability of the operation of the operation panel is improved.

In the case where the power button and the optical sensor are located close to each other in the operation panel, a finger of the rider operating the power button may block light advancing toward the illuminance sensor. In a preferred embodiment of the present invention, after a predetermined time period passes after the controller is activated by the power button being pressed by the rider, the control of the headlight to be on or off is started. Namely, the control of the headlight to be on or off is not started until a predetermined time period passes after the controller is activated by the power button being pressed by the rider. During the predetermined time period, the finger used to operate the power button may move away from the area in the vicinity of the power button and the optical sensor. Thus, the headlight is prevented from being turned on due to the light advancing toward the optical sensor being blocked by the finger operating the power button.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, electrically power assisted bicycles according to preferred embodiments of the present invention will be described with reference to the drawings. In the following preferred embodiments, like components will have like reference signs, and the same descriptions will not be repeated. In the preferred embodiments of the present invention, the terms "front", "rear", "left", "right", "up" and "down" respectively refer to front, rear, left, right, up and down in a state where a rider of an electrically power assisted bicycle sits on a saddle (seat) thereof while facing a handle thereof.

In the following description, an electrically power assisted bicycle including a child seat that allows a child to sit thereon will be described as an example. In the following description, the term "rider" does not refer to the child who is on the electrically power assisted bicycle, but refers to a person operating the bicycle. It is not required that a child is on the electrically power assisted bicycle. Preferred embodiments of the present invention are applicable to an electrically power assisted bicycle that does not include the child seat. The following preferred embodiments are illustrative, and the present invention is not limited to the following preferred embodiments.

Figure 1:
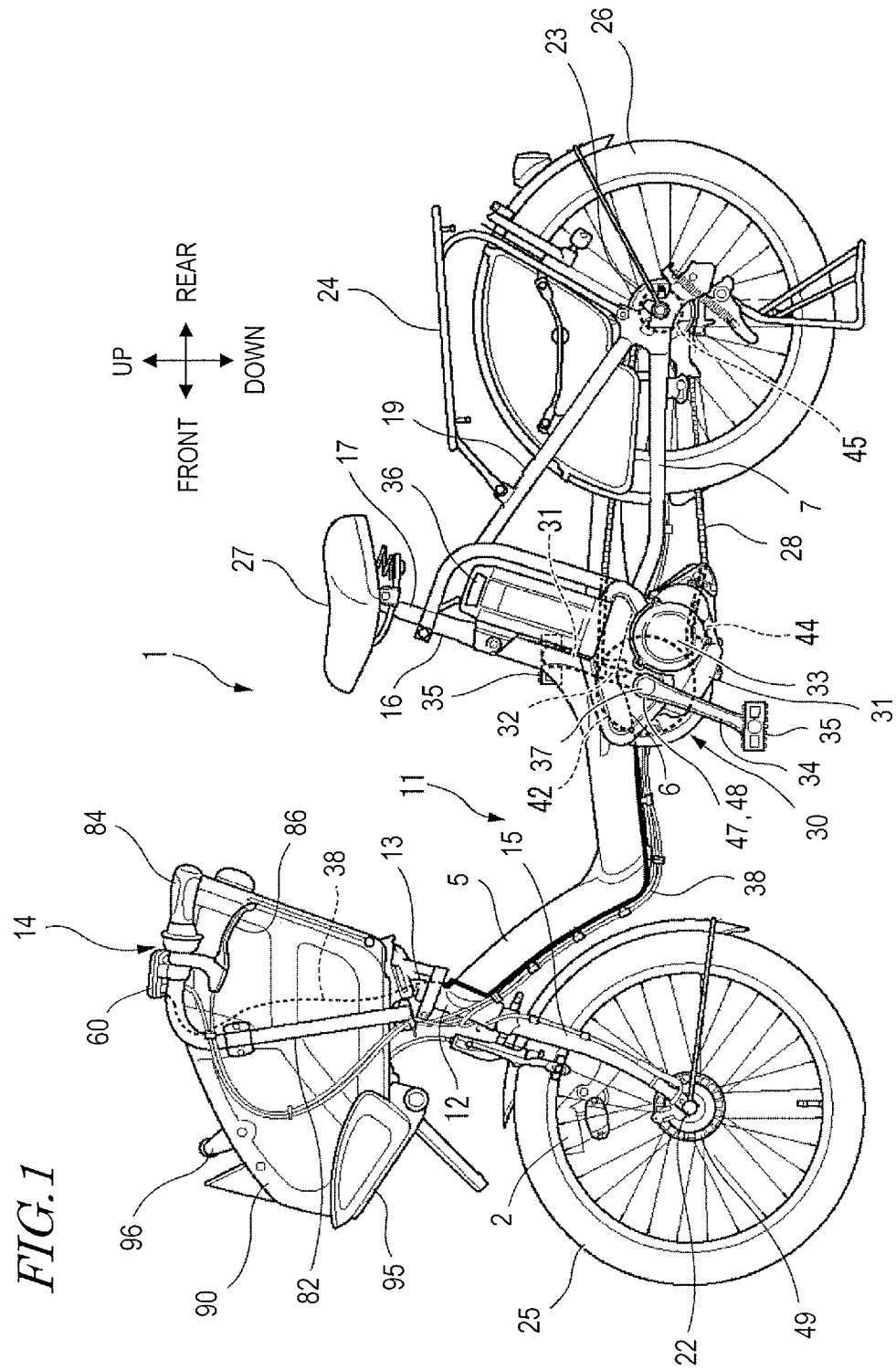
FIG. 1 is a side view of an electrically power assisted bicycle according to a preferred embodiment of the present invention.

FIG. 1 is a side view of an electrically power assisted bicycle 1 according to a preferred embodiment of the present invention. FIG. 1 shows a two-wheel electrically power assisted bicycle as a non-limiting example of the electrically power assisted bicycle 1.

The electrically power assisted bicycle 1 includes a vehicle frame 11 extending in a front-rear direction. The vehicle frame 11 includes a head pipe 12, a down tube 5, a bracket 6, a chain stay 7, a seat tube 16, and a seat stay 19. The head pipe 12 is located at a front end of the vehicle frame 11. The handle stem 13 is rotatably inserted into the head pipe 12. A handle 14 is secured to a top portion of the handle stem 13. A front fork 15 is secured to a bottom portion of the handle stem 13. At a bottom end of the front fork 15, a front wheel 25, which is a steered wheel, is rotatably supported via an axle 22. At the bottom end of the front fork 15, a front wheel rotation sensor 49 that detects the rotation of the front wheel 25 is provided. To the side of the front wheel 25, a headlight 2 is located. The headlight 2 is attached to the front fork 15.

The handle 14 is provided with a child seat 90 such that the child seat 90 is pivotable together with the handle 14. When the rider pivots the handle 14 to operate the handle 14, the child seat 90 is pivoted together with the handle 14.

The down tube 5 extends obliquely downward and rearward from the head pipe 12. The seat tube 16 extends upward from a rear end of the down tube 16. The chain stay 7 extends rearward from a bottom end of the seat tube 16. The bracket 6 connects a rear end of the down tube 5, the bottom end of the seat tube 16 and a front end of the chain stay 7 to each other.

A seat post 17 is inserted into the seat tube 16. A saddle 27, on which the rider sits, is provided at a top end of the seat post 17. A rear end of the chain stay 7 rotatably supports a rear wheel 26, which is a driving wheel. The seat stay 19 extends obliquely rearward and downward from a top portion of the seat tube 16. A bottom end of the seat stay 19 is connected with a rear portion of the chain stay 7. The seat stay 19 supports a rack 24 provided to the rear of the saddle 27.

A drive unit 30 is attached to the bracket 6 located at, or in the vicinity of, a vehicle center of the vehicle frame 11. The drive unit 30 includes a control device 32, an electric motor 33, crank arms 34, pedals 35, a crankshaft 37, a drive sprocket 42, an assist sprocket 44, a torque sensor 47, and a crank sensor 48. These components included in the drive unit 30 are incorporated into a unit case 31. A driven sprocket 45 is provided coaxially with a driving shaft 23 of the rear wheel 26. A detachable battery 36 that supplies electric power to the electric motor 33 and the like is mounted on the bracket 6. The detachable battery 36 may be supported by the seat tube 16. The detachable battery 36 is attachable to, and detachable from, the electrically power assisted bicycle 1. In a state where the detachable battery 36 is detached from the electrically power assisted bicycle 1, the detachable battery 36 is connected with an external charger (not shown) to be charged.

The crankshaft 37 is supported by extending through the drive unit 30 in a left-right direction. At both of two ends of the crankshaft 37, the crank arms 34 are provided. At a tip of each of the crank arms 34, the pedal 35 is rotatably provided. Human power (pressing force) applied by the rider to the pedals 35 is detected by the torque sensor 47 as a torque generated in the crankshaft 37. The crank sensor 48 detects the rotation of the crankshaft 37.

The control device 32 controls various operations of the electrically power assisted bicycle 1. A rotation output of the crankshaft 37 generated when the rider presses and rotates the pedals 35 is transmitted to the rear wheel 26 via the drive sprocket 42, a chain 28 and the driven sprocket 45. The control device 32 is configured or programmed to control the electric motor 33 such that the electric motor 33 generates a driving assist output in accordance with the rotation output of the crankshaft 37. The driving assist output from the electric motor 33 is transmitted to the rear wheel 26 via the assist sprocket 44, the chain 28 and the driven sprocket 45. Instead of the chain 28, a belt, a shaft or the like may be used. With the electrically power assisted bicycle 1, the electric motor 33 generates an assist power that assists the human power of the rider, so that the load on the rider is decreased when, for example, the electrically power assisted bicycle 1 is running on a slope or carrying a load.

The handle 14 is provided with an operation panel 60. The rider operates the operation panel 60 to switch on or off the electrically power assisted bicycle 1 or set the magnitude of the assist power of the electric motor 33. The operation panel 60 transmits or receives information to and from the control device 32 via a line 38.

Figure 2:
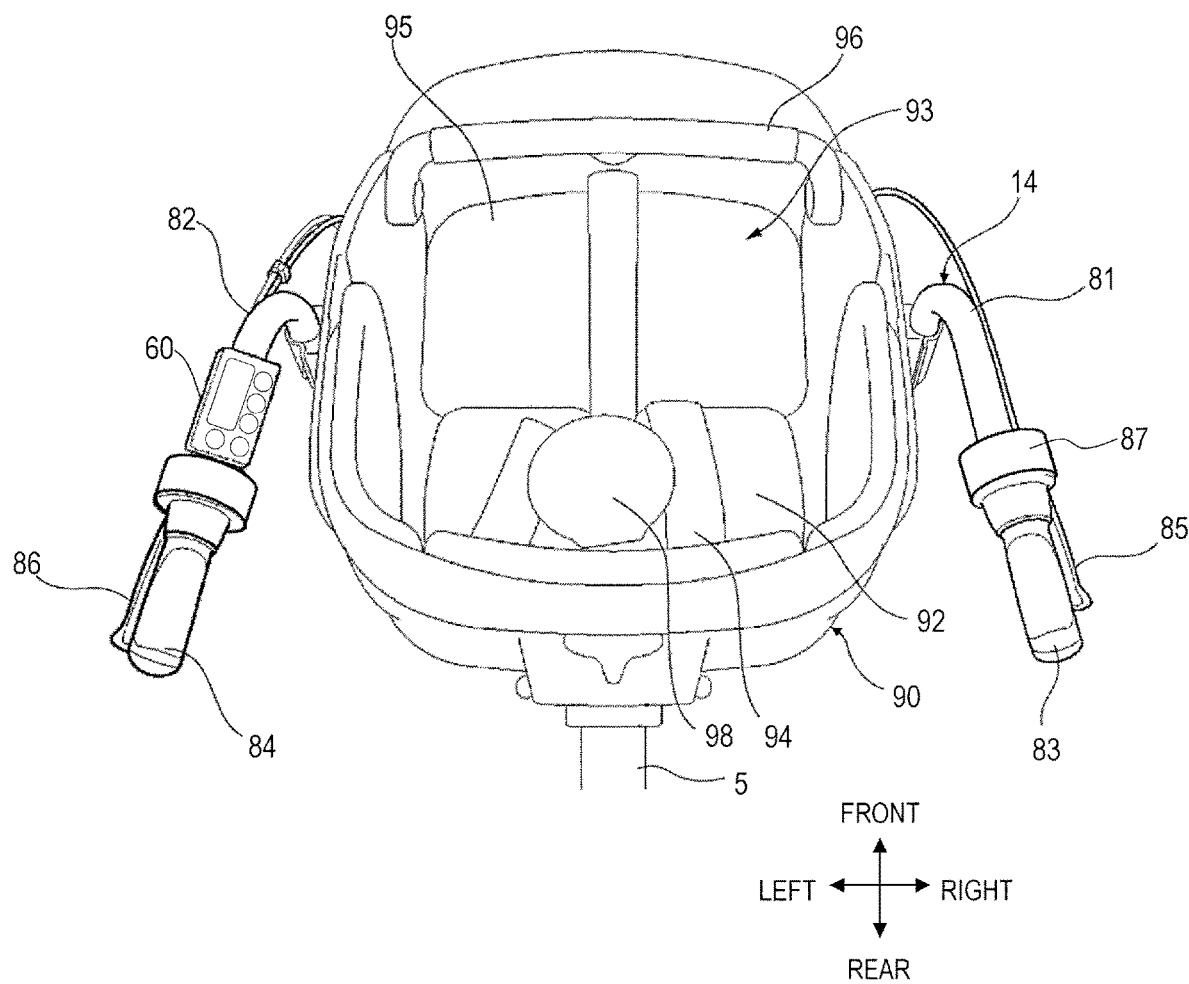
FIG. 2 is an isometric view showing a front portion of the electrically power assisted bicycle in a preferred embodiment of the present invention.

FIG. 2 is an isometric view showing a front portion of the electrically power assisted bicycle 1. The handle 14 includes a right handle bar 81 and a left handle bar 82. At a rear end of the right handle bar 81, a right grip 83 is provided. At a rear end of the left handle bar 82, a left grip 84 is provided. The rider steers the electrically power assisted bicycle 1 while gripping the right grip 83 and the left grip 84.

A front wheel brake lever 85 is provided in the vicinity of the right grip 83. A rear wheel brake lever 86 is provided in the vicinity of the left grip 84. When the rider grips the right grip 83 and also the front wheel brake lever 85 with his/her right hand, a braking force is provided to the front wheel 25. When the rider grips the left grip 84 and also the rear wheel brake lever 86 with his/her left hand, a braking force is provided to the rear wheel 26.

A gear shifter 87 usable by the rider to switch the gear ratio is provided in the vicinity of the right grip 83 provided on the right handle bar 81. The operation panel 60 is provided in the vicinity of the left grip 84 provided on the left handle bar 82.

The handle 14 supports the child seat 90, in which a child may sit. The child seat 90 is located between the right handle bar 81 and the left handle bar 82. The child seat 90 has a concaved shape with a top opening. The child seat 90 includes a sitting portion 92, at a bottom surface thereof, on which a child may sit. The child seat 90 includes a through-hole 93, allowing the legs of a child to be inserted, to the front of the sitting portion 92. Below the through-hole 93, a footrest 95 is provided. The child seat 90 includes a seat belt 94 that holds the body of the child while the child is sitting. The seat belt 94 includes a buckle 98 that fastens or loosens the seat belt 94. A bar 96 that is able to be gripped by a child is provided at a position forward and upward with respect to the sitting portion 92.

Figure 3:
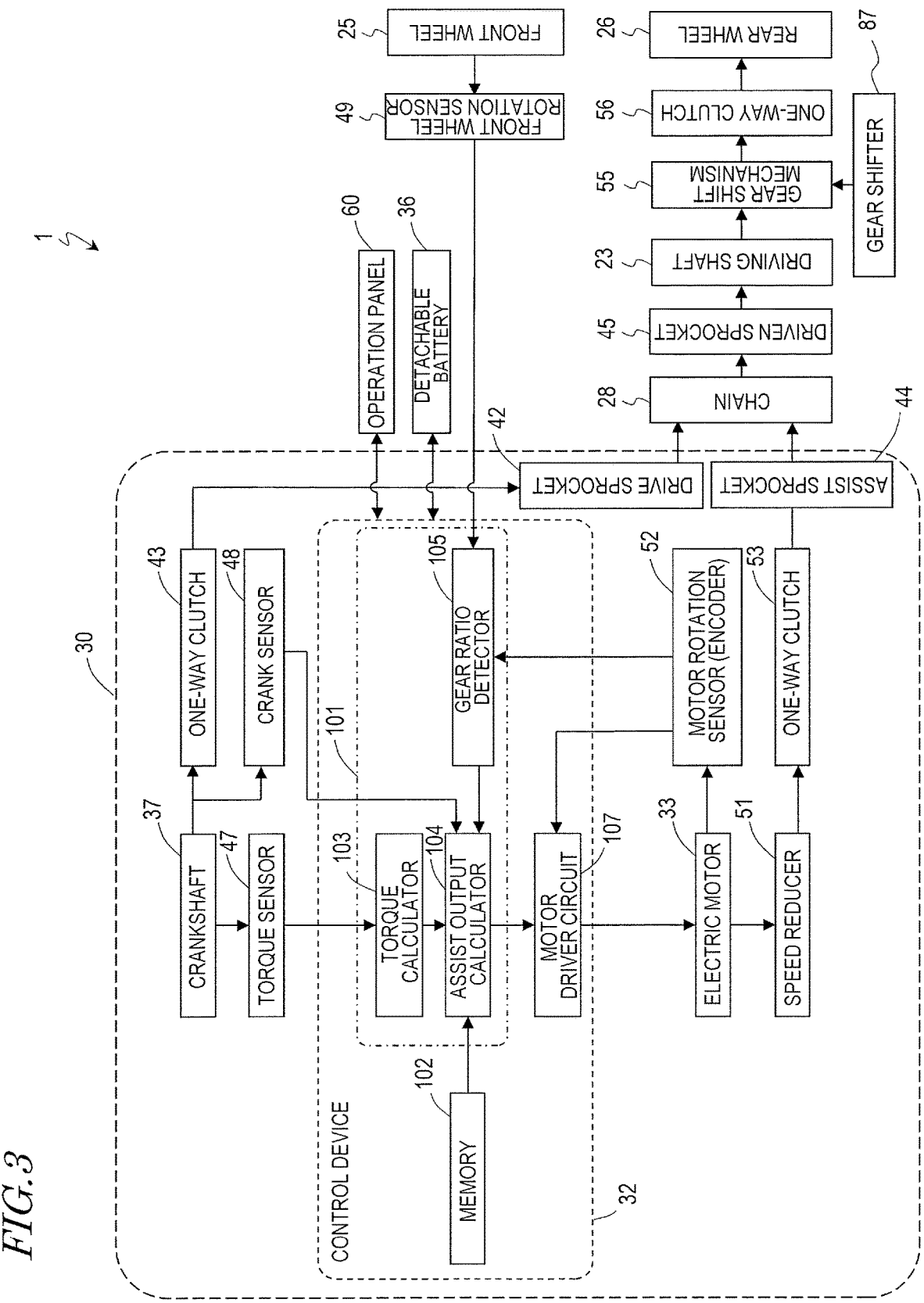
FIG. 3 is a block diagram showing a mechanical and electrical structure of the electrically power assisted bicycle in a preferred embodiment of the present invention.

FIG. 3 is a block diagram showing a mechanical and electric structure of the electrically power assisted bicycle 1. The drive unit 30 includes the crankshaft 37, the torque sensor 47, a one-way clutch 43, the crank sensor 48, the drive sprocket 42, the control device 32, the electric motor 33, a motor rotation sensor 52, a speed reducer 51, a one-way clutch 53, and the assist sprocket 44. The drive unit 30 is an assist output control system that causes the electric motor 33 to generate a driving assist output in accordance with human power of the rider applied to the pedals 35.

First, a transmission route of mechanical power will be described. When the rider presses the pedals 35 to rotate the crankshaft 37, the rotation of the crankshaft 37 is transmitted to the chain 28 via the one-way clutch 43 and the drive sprocket 42. The one-way clutch 43 transmits only a forward rotation of the crankshaft 37 to the drive sprocket 42, but does not transmit a reverse rotation of the crankshaft 37 to the drive sprocket 42. The rotation of the electric motor 33 is transmitted to the chain 28 via the speed reducer 51, the one-way clutch 51 and the assist sprocket 44. The one-way clutch 51 transmits, to the assist sprocket 44, only a rotation of the electric motor 33 in such a direction as to rotate the chain 28 in a forward direction, but does not transmit, to the assist sprocket 44, a rotation of the electric motor 33 in such a direction as to rotate the chain 28 in a reverse direction. The crank rotation output generated by the human power applied by the rider to the pedals 35 and the driving assist output generated by the electric motor 33 are combined by the chain 28. The human power and the assist force generated by the electric motor 33 may be combined at the chain 28 or combined at a mechanism that rotates about the same rotation axis as the crankshaft 37.

The rotation of the chain 28 is transmitted to the driving shaft 23 via the driven sprocket 45. The rotation of the driving shaft 28 is transmitted to the rear wheel 26 via a gear shift mechanism 55 and a one-way clutch 56.

The gear shift mechanism 55 changes the gear ratio in accordance with the input operation made by the rider on the gear shifter 87. The one-way clutch 56 transmits the rotation of the driving shaft 23 to the rear wheel 26 only when the rotation rate of the driving shaft 23 is higher than the rotation rate of the rear wheel 26. When the rotation rate of the driving shaft 23 is lower than the rotation rate of the rear wheel 26, the one-way clutch 56 does not transmit the rotation of the driving shaft 23 to the rear wheel 26.

Now, driving control performed by the control device 32 on the electric motor 33 will be described. The control device 32 is, for example, an MCU (Motor Control Unit). Thus, the control device 32 is also referred to as a "control unit". The control device 32 includes a microcontroller 101, a memory 102, and a motor driver circuit 107. The microcontroller 101 controls the operation of the electric motor 33 and also controls the operation of the components of the electrically power assisted bicycle 1. The memory 102 has stored therein, for example, a computer program that defines a procedure that is used to control the electric motor 33 and the components of the electrically power assisted bicycle 1. The microcontroller 101 reads the computer program from the memory 102 to execute various controls. The area enclosed by the one-dot chain line in FIG. 3 shows a functional block of the microcontroller 101. The microcontroller 101 acts as a torque calculator 103, an assist output calculator 104, and a gear ratio detector 105.

The human power (pressing power) applied by the rider on the pedals 35 is detected by the torque sensor 47 as a torque generated in the crankshaft 37. The torque sensor 47 outputs a voltage signal in accordance with the detected torque to the torque calculator 103. The torque calculator 103 converts the voltage signal from the torque sensor 47 into a torque. For example, the torque calculator 103 converts an analog voltage signal input from the torque sensor 47 into a digital voltage signal, and calculates the torque based on the level of the digital voltage signal. The torque calculator 103 outputs the calculated torque to the assist output calculator 104.

The crank sensor 48 detects a rotation angle of the crankshaft 37. The crank sensor 48 outputs a signal in accordance with the rotation angle of the crankshaft 37 to the assist output calculator 104. For example, the crank sensor 48 detects the rotation of the crankshaft 37 at an interval of a predetermined angle and outputs a square wave signal or a sine wave signal. The assist output calculator 104 calculates a rotation rate of the crankshaft 37 based on the output signal from the crank sensor 48. The assist output calculator 104 multiplies the rotation rate of the crankshaft 37 by the torque calculated by the torque calculator 103 to calculate a crank rotation output.

The electric motor 33 is provided with the motor rotation sensor 52. The motor rotation sensor 52 is, for example, an encoder. The motor rotation sensor 52 detects a rotation angle of a rotor of the electric motor 33 and outputs a signal in accordance with the rotation angle to the gear ratio detector 105 and the motor driver circuit 107. For example, the motor rotation sensor 52 detects the rotation of the rotor at an interval of a predetermined angle and outputs a square wave signal or a sine wave signal. The gear ratio detector 105 and the motor driver circuit 107 calculate a rotation rate of the electric motor 33 based on the output signal from the motor rotation sensor 52.

The front wheel rotation sensor 49 detects a rotation angle of the front wheel 25 and outputs a signal in accordance with the rotation angle to the gear ratio detector 105. For example, the front wheel rotation sensor 49 detects the rotation of the front wheel 25 at an interval of a predetermined angle and outputs a square wave signal or a sine wave signal. The gear ratio detector 105 calculates a rotation rate of the front wheel 25 based on the output signal from the front wheel rotation sensor 49. The gear ratio detector 105 calculates a gear ratio based on the rotation rate of the electric motor 33 and the rotation rate of the front wheel 25, and outputs the calculated gear ratio to the assist output calculator 104.

The assist output calculator 104 calculates a command value to cause the electric motor 33 to generate an appropriate driving assist output based on the outputs from the torque calculator 103, the crank sensor 48 and the gear ratio detector 105, a button operation made by the rider on the operation panel 60, information stored in the memory 102, or the like. Then, the assist output calculator 104 outputs the command value to the motor driver circuit 107. The assist output calculator 104, for example, refers to a map created based on, for example, the relationship between the crank rotation output generated by the human power of the rider applied to the pedals 35 and the driving assist output generated by the electric motor 33 to calculate the command value. In the memory 102, a plurality of types of maps are stored. The assist output calculator 104 reads a map suitable to corresponding certain conditions from the memory 102 and refers to the read map to calculate the command value.

The motor driver circuit 107 is, for example, an inverter, and supplies electric power in accordance with the command value from the assist output calculator 104 to the electric motor 33 via the detachable battery 36. When supplied with the electric power, the electric motor 33 is rotated to generate a predetermined driving assist output. In this manner, the assist output calculator 104 allows the electric motor 33 that generates a driving assist output to assist the motion of the rider pressing the pedals 35 while the electrically power assisted bicycle 1 is running.

Now, the operation panel 60 will be described in detail.

Figure 4:
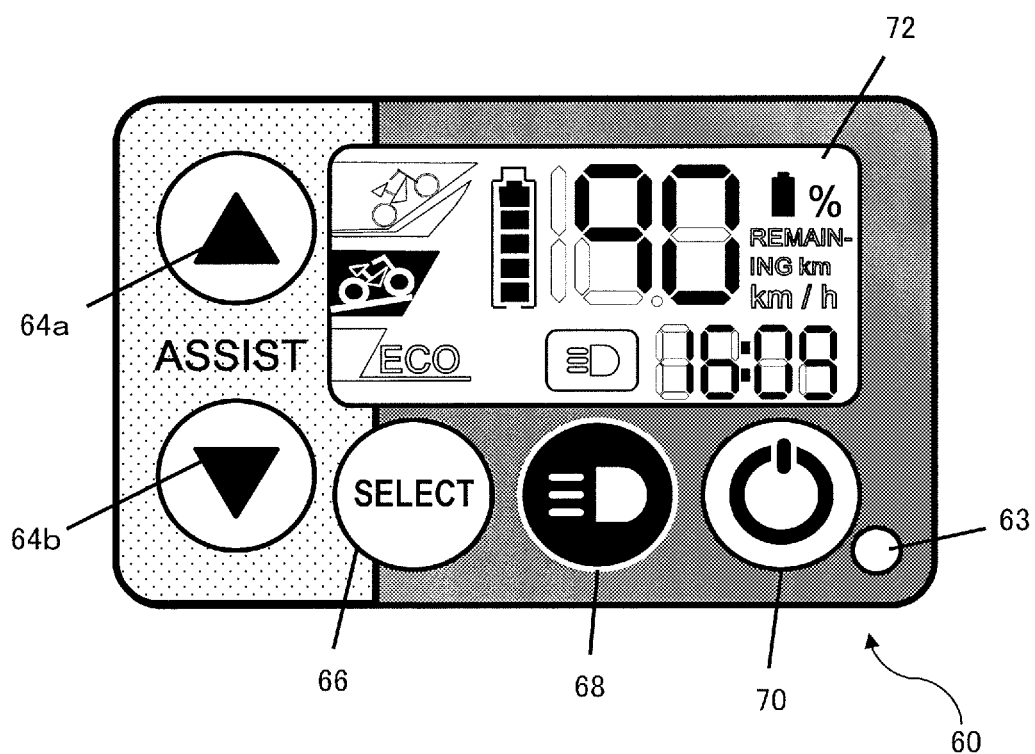
FIG. 4 is an external view of an operation panel in a preferred embodiment of the present invention.

FIG. 4 is an external view of the operation panel 60. The operation panel 60 includes a plurality of buttons 64a, 64b, 66, 68 and 70 that accept an input operation made by the rider, and also includes an optical sensor 63 and a liquid crystal panel 72. The plurality of buttons include, specifically, assist force setting buttons 64a and 64b, a switch button 66, a headlight button 68, and a power button 70, for example.

The assist force setting buttons 64a and 64b are used to set an assist force of the electric motor 33 or a running mode corresponding to the magnitude of the assist force. The "assist force" of the electric motor 33 is a force that assists the human power. In this example, four running modes are provided for the electrically power assisted bicycle 1. The four running modes are, for example, an assist-free mode, an ecological mode, a standard mode and a strong mode, in the order from the mode in which the magnitude of assistance to human power is weakest. In the assist-free mode, the electric motor 33 does not generate any assist force.

When the rider presses the assist force setting button 64a in the assist-free mode, the assist-free mode is changed to the ecological mode. When the rider presses the assist force setting button 64a in the ecological mode, the ecological mode is changed to the standard mode. When the rider presses the assist force setting button 64a in the standard mode, the standard mode is changed to the strong mode. Even if the rider presses the assist force setting button 64a in the strong mode, the strong mode is maintained and is not changed. By contrast, when the assist force setting button 64b is pressed in this state, the strong mode is changed to the standard mode as described below.

The assist force setting button 64b is pressed to select a running mode that provides a weaker assist force, opposite to the assist force setting button 64a. When the rider presses the assist force setting button 64b in the strong mode, the strong mode is changed to the standard mode. When the rider presses the assist force setting button 64b in the standard mode, the standard mode is changed to the ecological mode. When the rider presses the assist force setting button 64b in the ecological mode, the ecological mode is changed to the assist-free mode. Even if the rider presses the assist force setting button 64b in the assist-free mode, the assist-free mode is maintained and is not changed. When the rider presses the assist force setting button 64a in this state, the assist-free mode is changed to the ecological mode.

In the example shown in FIG. 4, a running mode display area is provided in a left portion of a display screen of the liquid crystal panel 72. In the example shown in FIG. 4, the standard mode at the center is highlighted to show that the standard mode is now selected.

The switch button 66 is used by the rider to switch the display on the liquid crystal panel 72. In the present preferred embodiment, the liquid crystal panel 72 is able to display the remaining capacity of the detachable battery 36, the remaining distance by which assisted running is possible, and the current running speed. Each time the rider presses the switch button 66, the display on the liquid crystal panel 72 is sequentially switched to the remaining capacity of the detachable battery 36, to the remaining distance by which assisted running is possible, and to the current running speed. In the example shown in FIG. 4, such information is displayed in an upper right portion of the display screen of the liquid crystal panel 72. In FIG. 4, the remaining capacity of the detachable battery 36 is displayed as "90%", for example. The other items, specifically, "remaining km" and "km/h", respectively represent the remaining distance by which assisted running is possible and the current running speed.

The operation panel 60 includes a clock function. In a display area in a lower right portion of the display screen of the liquid crystal panel 72, time is displayed. In FIG. 4, time "16:09" is displayed. In the present preferred embodiment, a controller 62 (FIG. 7) included in the operation panel 60 is configured or programmed to calculate time and displays the time on the liquid crystal panel 72.

The power button 70 is used to turn on or off the electrically power assisted bicycle 1. When the electrically power assisted bicycle 1 is in a power-on state, the drive unit 30 is operable. When the electrically power assisted bicycle 1 is in a power-off state, the drive unit 30 is not operable.

In the present preferred embodiment, the liquid crystal panel 72 displays letters, symbols, icons and the like using a segment system, for example. This is merely illustrative. The liquid crystal panel 72 may display letters, symbols, icons and the like in a display area using a dot matrix system, or display a moving image. The liquid crystal panel 72 is shown as an example of the display of the operation panel 60. Alternatively, a display other than the liquid crystal panel, for example, an organic EL panel or an electronic paper may be used.

Figure 5:
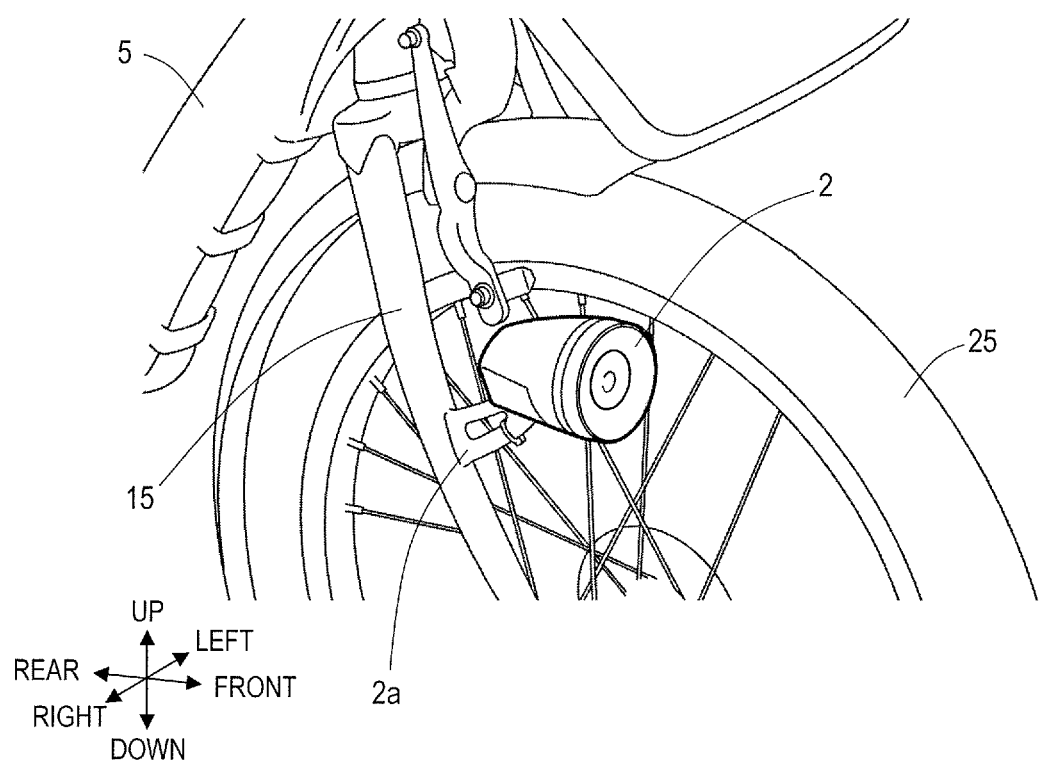
FIG. 5 is an isometric view showing a headlight in a preferred embodiment of the present invention.

The headlight button 68 is used to alternately switch the headlight 2 to be on or off. FIG. 5 is an isometric view showing the headlight 2. In the example shown in FIG. 5, the headlight 2 is attached to the front fork 15 via a headlight bracket 2a. When the headlight button 68 is pressed to turn on the headlight 2, the headlight 2 emits light to illuminate the path on which the electrically power assisted bicycle 1 is advancing.

Light is incident on the optical sensor 63 from an area around the electrically power assisted bicycle 1. The optical sensor 63 outputs a signal in accordance with the received light. The headlight 2 is turned on or off in accordance with the output signal from the optical sensor 63. In this manner, the headlight 2 is automatically turned on or off in accordance with the brightness of the area around the electrically power assisted bicycle 1. The optical sensor 63 is, for example, an illuminance sensor, but is not limited to this. The optical sensor 63 may be any sensor that detects visible light. In the following description, the optical sensor 63 is an illuminance sensor as a non-limiting example.

In the example shown in FIG. 5, the headlight 2 is located to the side of the front wheel 25. Preferred embodiments of the present invention are not limited to such a structure. For example, in the case where the electrically power assisted bicycle 1 includes a front basket, the headlight 2 may be attached to a front portion, a bottom surface or the like of the front basket.

Figure 6:
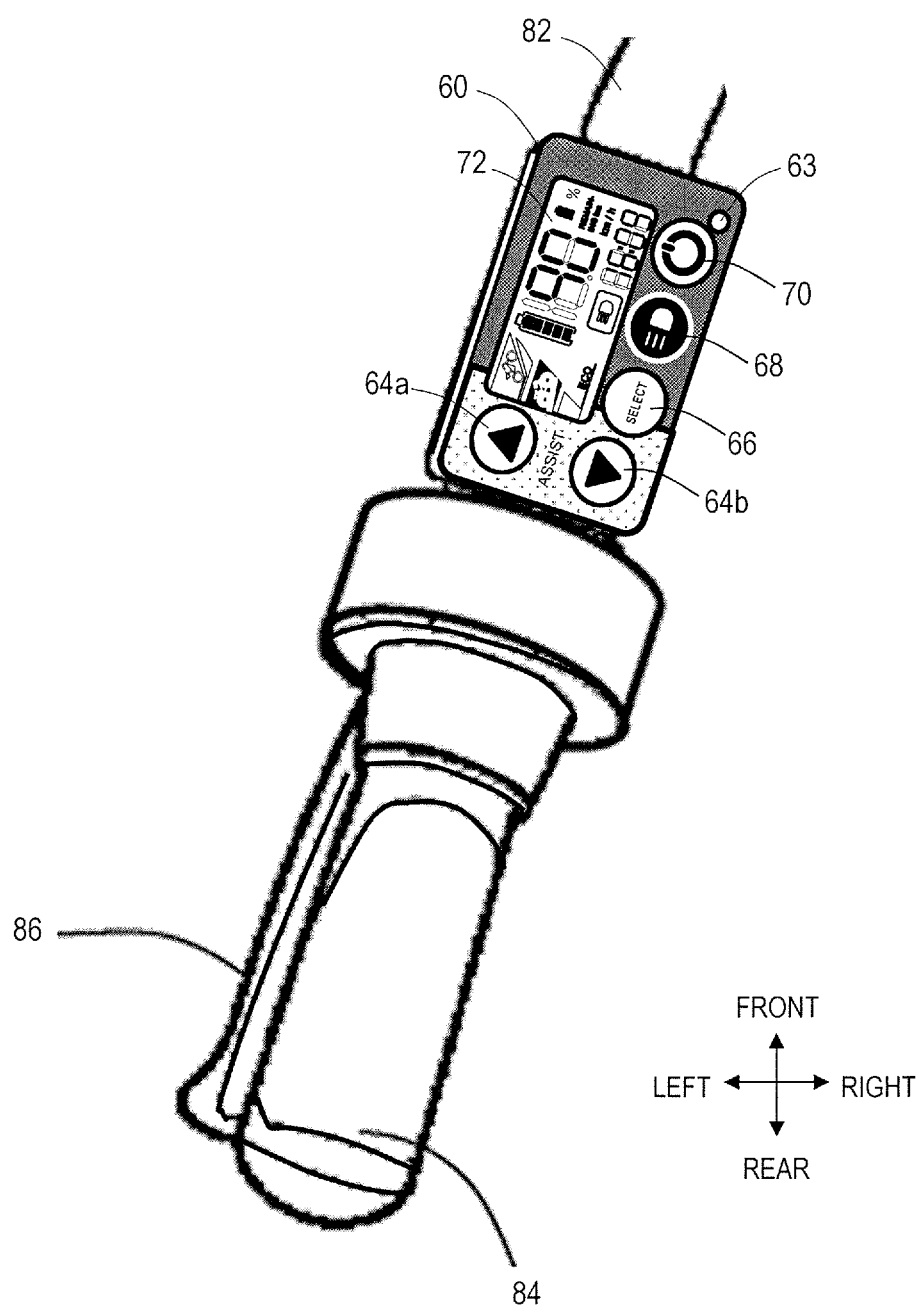
FIG. 6 is an isometric view showing an operation panel provided in the vicinity of a grip of a handle in a preferred embodiment of the present invention.

FIG. 6 is an isometric view showing the operation panel 60 provided in the vicinity of the left grip 84 of the handle 14. The operation panel 60 includes the assist force setting buttons 64a and 64b, the switch button 66, the headlight button 68, the power button 70 and the illuminance sensor 63 located in this order from a position closer to the left grip 84 to a position farther away from the left grip 84. The illuminance sensor 63 is located in the vicinity of the power button 70.

In the present preferred embodiment, buttons used more frequently are located closer to the left grip 84. For example, the assist force setting buttons 64a and 64b are used more frequently than the other buttons. The frequency of use of the switch button 66 is second highest to that of the assist force setting buttons 64a and 64b. The frequency of use of the headlight button 68 is low, and the frequency of use of the power button 70 is lowest. As shown in FIG. 6, buttons used more frequently are located closer to the left grip 84, so that the degree with which the rider's hand is away from the left grip 84 to operate the operation panel 60 is low.

The power button 70 is located farther away from the left grip 84. With such an arrangement, the possibility that the rider inadvertently presses the power button 70 while operating any other button and unintentionally turns off the electrically power assisted bicycle 1 is significantly reduced or prevented.

The illuminance sensor 63 is located farthest from the left grip 84. With such an arrangement, the possibility that the rider has his/her finger block the light from being incident on the illuminance sensor 63 while operating any other button is significantly reduced or prevented.

Figure 7:
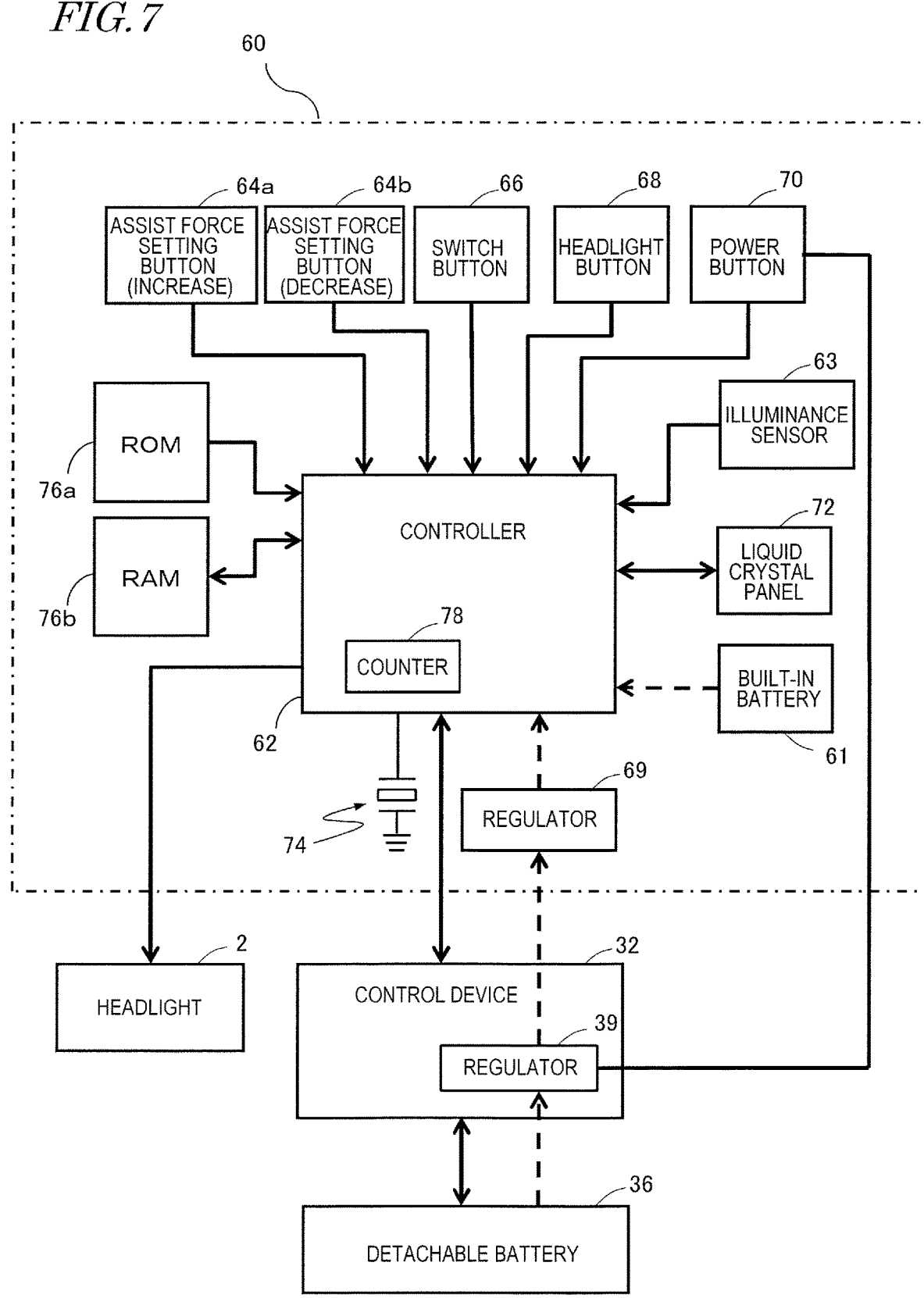
FIG. 7 shows a hardware structure of the operation panel in a preferred embodiment of the present invention.

FIG. 7 shows a hardware structure of the operation panel 60. In addition to the buttons and the like shown in FIG. 4, the operation panel 60 includes a built-in battery 61, the controller 62, a regulator 69, an oscillator 74 made of quartz or silicon, a ROM 76a, and a RAM 76b.

The controller 62 is preferably a microcontroller or a control circuit that controls the operation of the operation panel 60, and is, for example, a semiconductor integrated circuit. In a state where the detachable battery 36 is attached to the electrically power assisted bicycle 1 and the electrically power assisted bicycle 1 is in the power-on state, the controller 62 is powered by the electric power supplied from the detachable battery 36. In a state where the electrically power assisted bicycle 1 is in the power-on state, the controller 62 may be powered by the electric power of the built-in battery 61. The built-in battery 61 is, for example, a primary cell such as, for example, a button cell or the like. The built-in battery 61 may be a secondary cell, which is chargeable. In FIG. 7, the electric power supplied from the detachable battery 36 or the built-in battery 61 to the controller 62 is represented by the dashed line.

The control device 32 in the drive unit 30 (FIG. 1) includes a regulator 39 (FIG. 7). The power button 70 is connected with the control device 32 via the line 38 (FIG. 1). When the rider presses the power button 70 while the electrically power assisted bicycle 1 is in the power-off state, the regulator 39 starts operating. For example, when the power button 70 is pressed, a portion of the circuit in the control device 32 becomes conductive with the ground, and the regulator 39 starts operating using the conductive contact as a trigger. The regulator 39 decreases the output voltage of the detachable battery 36 (e.g., about 24 V) to the operating voltage of the control device 32 (e.g., about 12 V). The decreased voltage is supplied to the regulator 69 in the operation panel 60 via the line 38 (FIG. 1). The regulator 69 decreases the input voltage to the operating voltage of the controller 62 (e.g., about 5.0 V) and supplies the decreased voltage to the controller 62. The controller 62 is supplied with the electric power from the regulator 69 and is activated. Instead of the regulators 39 and 69, a DC/DC converter may be used.

The controller 62 supplied with the electric power from the regulator 69 reads a computer program stored in the ROM 76a and executes the computer program in the RAM 76b to execute various processes on the operation panel 60. The ROM 76a and the RAM 76b may be incorporated into the controller 62.

The microcomputer 62 is connected with the plurality of buttons 64a, 64b, 66, 68 and 70 to detect that the respective buttons have been pressed. The buttons may be pressed in the manner of a "short press" and a "long press". The controller 62 detects a "short press" and a "long press". For example, when the rider starts pressing a button, the controller 62 detects a voltage value and/or a current value of a predetermined level or higher. When the rider finishes pressing the button, the controller 62 detects that the voltage value and/or the current value that has been detected is now, for example, zero. The controller 62 determines whether the press was a short press or a long press based on the time period from the detection of the voltage value and/or the current value until the detection of the voltage value and/or the current value becomes zero. The controller 62 may detect a short press or a long press of a plurality of buttons at the same time.

The controller 62 is configured or programmed to calculate time and displays the time on the liquid crystal panel 72. The controller 62 uses a counter 78 to calculate time. The controller 62 uses a clock signal supplied from the oscillator 74, or a frequency-divided signal obtained as a result of the frequency of the clock signal being divided, to count up the value of the counter 78. The controller 62 converts the count value to actual time. The method for calculating the time by use of the oscillator is known and thus will not be described herein in detail.

The controller 62 may use the counter 78 to measure the length of time. For example, the controller 62 uses a count value to determine whether the press on a button is a short press or a long press. The controller 62 also uses a count value to measure a time period in which the illuminance is not determined (described below).

The controller 62 is preferably configured or programmed to calculate dates in addition to the time. The controller 62 advances the dates one by one whenever the time is 0:00. In this case, the date may be displayed on the liquid crystal panel 72 in addition to the time.

When the electrically power assisted bicycle 1 is turned off from the power-on state, the drive unit 30 stops operating, but the controller 62 is put into a sleep mode to continue operating. In the sleep mode, the controller 62 is operated by the electric power supplied from the built-in battery 61. In order to significantly reduce or minimize the power consumption, the controller 62 performs a minimum possible amount of operation on the operation panel 60 in the sleep mode. The "minimum possible amount of operation" is, for example, calculation of time or the like. The calculation of time is continued even in the sleep mode, so that when the electrically power assisted bicycle 1 is turned on from the power-off state and the controller 62 is activated from the sleep mode, the controller 62 may display the current time on the liquid crystal panel 72.

Figure 8A:
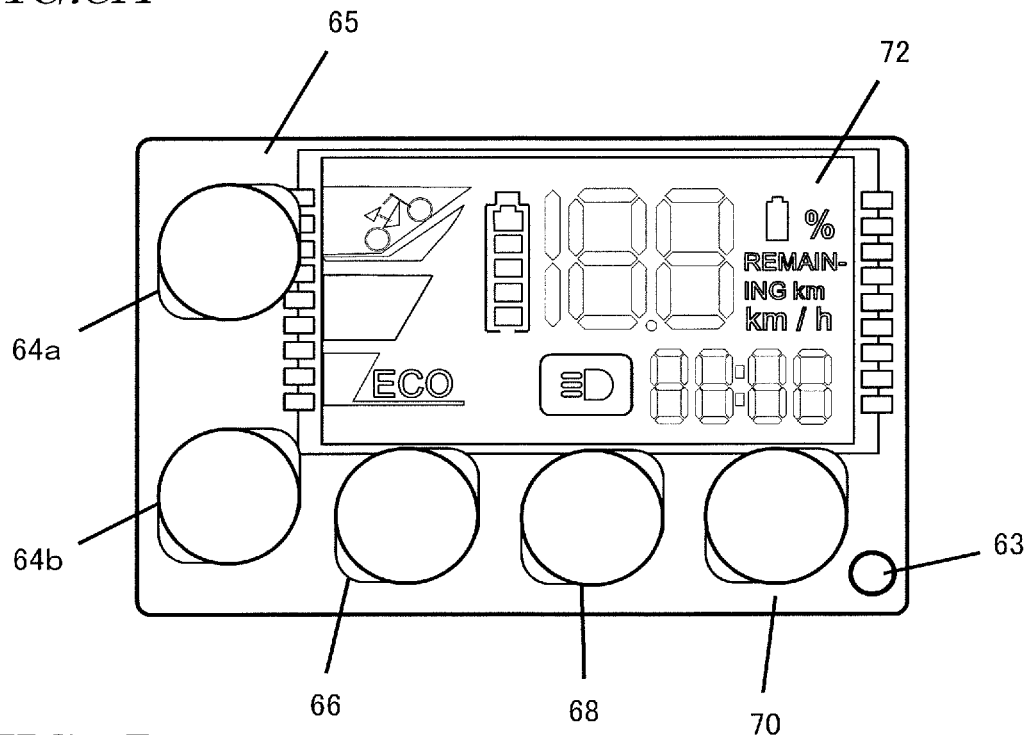
FIG. 8A shows a front surface of a printed circuit board in a preferred embodiment of the present invention.
Figure 8B:
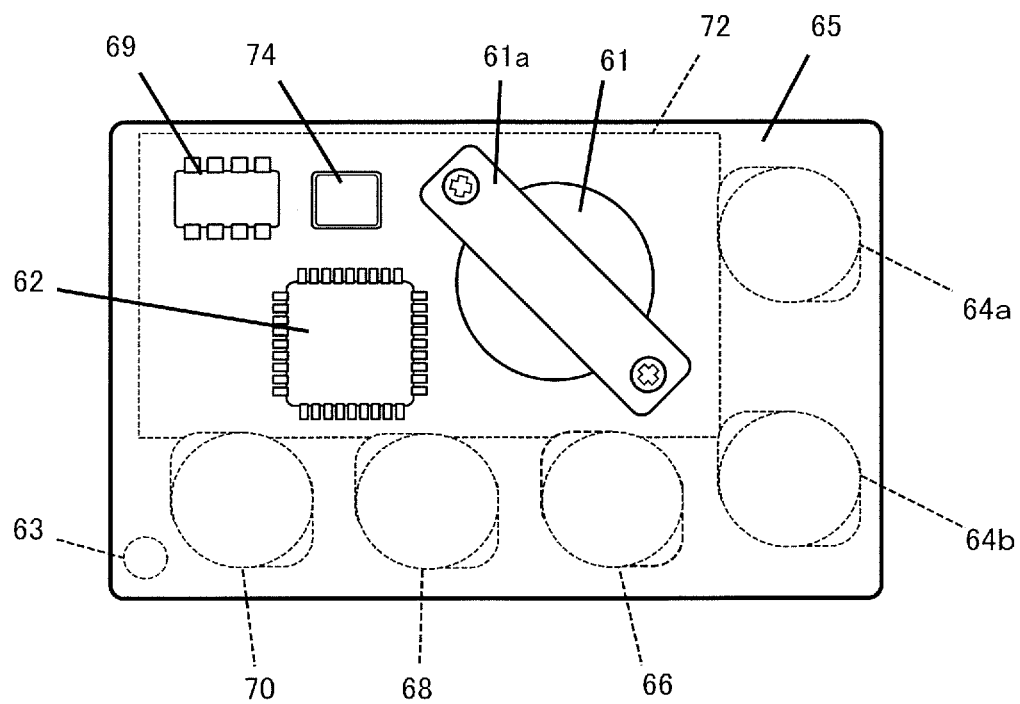
FIG. 8B shows a rear surface of the printed circuit board in a preferred embodiment of the present invention.

In the present preferred embodiment, the above-described components of the operation panel 60 are preferably mounted on one single printed circuit board. FIG. 8A shows a front surface of a printed circuit board 65 included on or in the operation panel 60. FIG. 8B shows a rear surface of the printed circuit board 65. In a state where the operation panel 60 is attached to the electrically power assisted bicycle 1, the front surface of the printed circuit board 65 is a top surface and the rear surface thereof is a bottom surface.

The liquid crystal panel 72 preferably has a large size, and therefore occupies a large area of the front surface of the printed circuit board 65. The liquid crystal panel 72 of such a large size is located in an upper right portion of the printed circuit board 65 as shown in FIG. 8A. The assist force setting buttons 64a and 64b, the switch button 66, the headlight button 68, the power button 70 and the illuminance sensor 63 are located in the remaining portions of the front surface of the printed circuit board 65.

As described above with reference to FIG. 6, the assist force setting buttons 64a and 64b, the switch button 66, the headlight button 68, the power button 70 and the illuminance sensor 63 are located on or in the operation panel 60 in this order from a position closer to the left grip 84 to a position farther away from the left grip 84. Since the area available for the buttons is limited, the illuminance sensor 63 is located close or adjacent to the power button 70. In a state where the area available for the buttons is limited, the buttons are located in this order, so that the operation panel 60 has a smaller size and the operability of the buttons by the rider is improved.

As shown in FIG. 8B, the built-in battery 61, the controller 62, the regulator 69 and the oscillator 74 are located on the rear surface of the printed circuit board 65. In this example, the ROM 76a and the RAM 76b are integrated with the controller 62.

In FIG. 8B, the components located on the front surface of the printed circuit board 65 are shown with dashed lines. In the example shown in FIG. 8B, the built-in battery 61, the controller 62, the regulator 69 and the oscillator 74 are located on the rear side of the area where the liquid crystal panel 72 is located. Such components may be located at any position that does not overlap electrodes of the liquid crystal panel 72. In the example shown in FIG. 8B, the rear side of the area where the liquid crystal panel 72 is provided is utilized as an area for the built-in battery 61, the controller 62, the regulator 69 and the oscillator 74. A plate 61a covering at least a portion of the built-in battery 61 is attached to the printed circuit board 65 by a screw, so that the built-in battery 61 is secured to the printed circuit board 65. The plate 61a may act as an electrode in electric contact with the built-in battery 61.

In the case where the components of the operation panel 60 are located as being divided into a plurality of substrates, or in the case where the substrate and the liquid crystal panel are located separately from each other, the operation panel 60 is thicker. In the present preferred embodiment, the components of the operation panel 60 are located on one printed circuit board 65, so that the operation panel 60 is kept thin. The line pattern of the printed circuit board 65 is used to electrically connect the components to each other, so that line disconnection is significantly reduced or prevented and thus the reliability of the operation of the operation panel 60 is improved.

Figure 9:
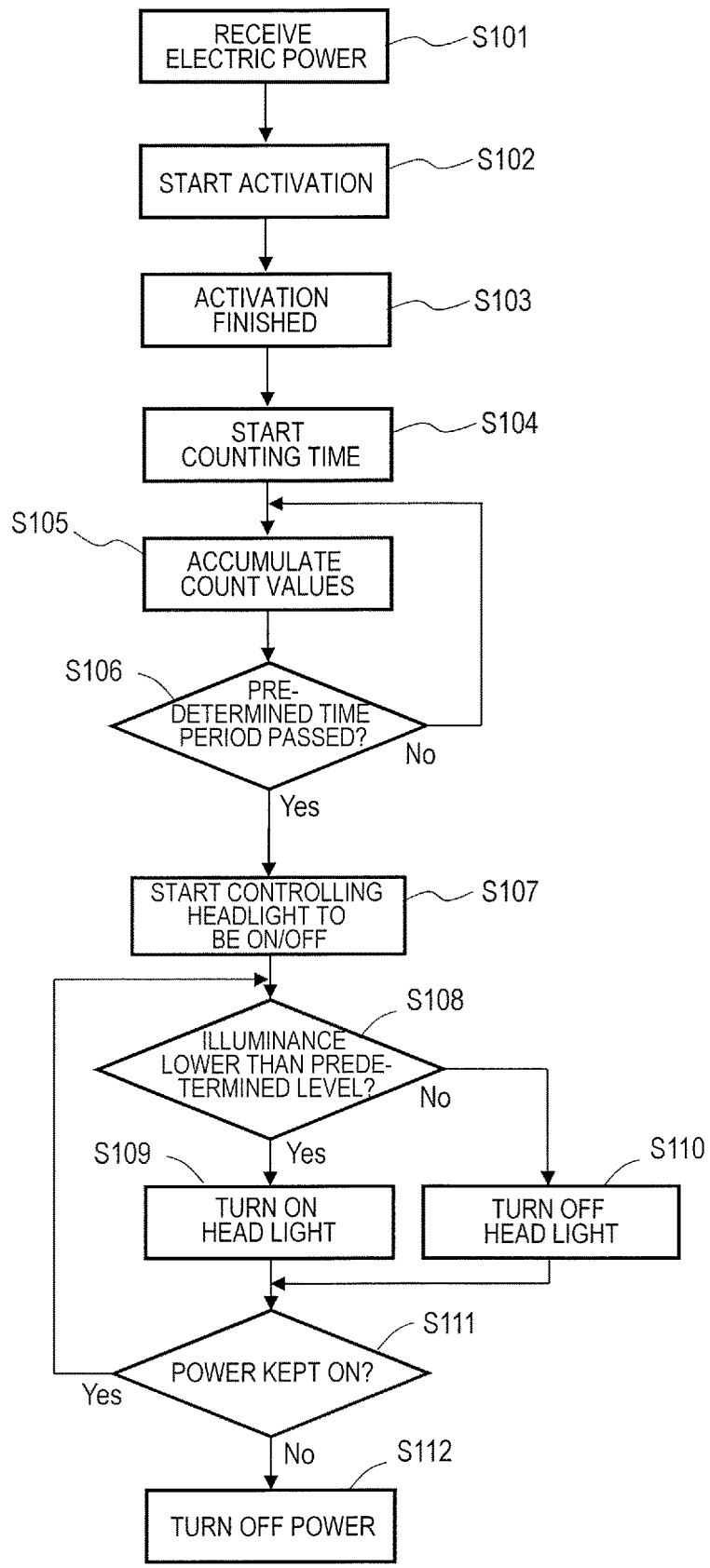
FIG. 9 is a flowchart showing an operation of a controller controlling the headlight to be on or off in a preferred embodiment of the present invention.

Now, an operation of the controller 62 controlling the headlight 2 to be on or off using the illuminance sensor 63 will be described in detail. FIG. 9 is a flowchart showing an operation of the controller 62 controlling the headlight 2 to be on or off using the illuminance sensor 63.

As described above, the illuminance sensor 63 is located close or adjacent to the power button 70 because the area available for the components is limited on or in the operation panel 60. For example, the illuminance sensor 63 is located at a position closer to the power button 70 than the buttons other than the power button 70 are. The illuminance sensor 63 may be in contact with the power button 70 or may be out of contact with the power button 70. For example, the power button 70 and the illuminance sensor 63 may be adjacent to each other.

In the case where the power button 70 and the illuminance sensor 63 are located close to each other on or in the operation panel 60, a finger of the rider operating the power button 70 may block light from reaching the illuminance sensor 63. In the present preferred embodiment, after a predetermined time period passes after the controller 62 is activated by the power button 70, control of the headlight 2 to be on or off is started. Namely, the control of the headlight 2 to be on or off is not started until a predetermined time period passes after the controller 62 is activated by the power button 70 being operated. The predetermined time period is, for example, about 1 second or longer and shorter than about 3 seconds, and preferably about 1 second or longer and shorter than about 2.5 seconds. During the predetermined time period, the finger used to operate the power button 70 may move away from the area in the vicinity of the power button 70 and the illuminance sensor 63. Thus, the headlight 2 is prevented from being turned on due to the light advancing toward the illuminance sensor 63 being blocked by the finger operating the power button 70.

Referring to FIG. 9, when the rider presses the power button 70 in a state where the electrically power assisted bicycle 1 is in the power-off state, the regulator 39 (FIG. 7) starts operating and thus the electric power is supplied to the controller 62 from the detachable battery 36 (step S101). The controller 62 supplied with the electric power from the detachable battery 36 starts an activation process (step S102).

Upon starting the activation process, the controller 62 reads a computer program stored in the ROM 76a and executes the computer program in the RAM 76b. Thus, the controller 62 is put into a state of accepting operations on the assist force setting buttons 64a and 64b, the switch button 66 and the headlight button 68. Thus, the activation process is finished (step S103). The activated controller 62 is now able to transmit or receive data to or from the control device 32 or to display various types of information on the liquid crystal panel 72.

The activated controller 62 starts counting time using the counter 78 and accumulates count values (steps S104 and S105). The controller 62 determines whether or not a predetermined time period has passed from the start of the time count (step S106). In this example, the predetermined time period is about 1.5 seconds. In the case where 1.5 seconds have not passed from the start of the time count, the controller 62 keeps on counting time. In the case where 1.5 seconds have passed from the start of the time count, the controller 62 starts controlling the headlight 2 to be on or off (step S107).

Upon starting the control of the headlight 2 to be on or off, the controller 62 receives an output signal from the illuminance sensor 63 and performs a process of determining whether or not to turn on the headlight 2 in accordance with the output signal (step S108). This determination process is performed by, for example, monitoring the output signal from the illuminance sensor 63 for about 0.3 seconds, for example. In the case where, for example, the output signal from the illuminance sensor 63 is kept at a level lower than a predetermined level for about 0.3 seconds, the controller 62 determines to turn on the headlight 2 (step S109). In the case where, for example, the output signal from the illuminance sensor 63 is kept at a level higher than, or equal to, the predetermined level for about 0.3 seconds, the controller 62 determines to turn off the headlight 2 (S110). The controller 62 turns on or off the headlight 2 in accordance with the determination result. Immediately after the electrically power assisted bicycle 1 is turned off, the headlight 2 is in an off state. Therefore, in the case where the output signal from the illuminance sensor 63 is kept at a level higher than, or equal to, the predetermined level, the controller 62 performs a process of keeping the headlight 2 in an off state. The time length of about 0.3 seconds is a non-limiting example, and the determination process may be performed by monitoring the output signal for a time period other than 0.3 seconds.

While the electrically power assisted bicycle 1 is in the power-on state, the process of determining whether or not to turn on the headlight 2 is continued (Yes in step S111). When the power button 70 is pressed to turn off the electrically power assisted bicycle 1, the controller 62 is also turned off and the process is finished.

After a predetermined time period passes after the activation of the controller 62, the controller 62 starts controlling the headlight 2 to be on or off. During the predetermined time period, the finger used to operate the power button 70 may move away from the area around the power button 70 and the illuminance sensor 63. Thus, the headlight 2 is prevented from being turned on due to the light advancing toward the illuminance sensor 63 being blocked by the finger operating the power button 70.

The controller 62 does not start controlling the headlight 2 to be on or off until the predetermined time period passes. For example, a state where the controller 62 receives an output signal from the illuminance sensor 63 but does not use the output signal for the process of determining whether or not to turn on the headlight 2 corresponds to the state where "the controller 62 has not started to control the headlight 2 to be on or off". A state where the illuminance sensor 63 is not conductive immediately after the electrically power assisted bicycle 1 is turned on also corresponds to the state where "the controller 62 has not started to control the headlight 2 to be on or off".

The predetermined time period for which the controller 62 does not start controlling the headlight 2 to be on or off may be changed in accordance with the time of the activation of the controller 62. In the case where, for example, the controller 62 is activated at night time, when it is desirable to turn on the headlight 2 quickly, the predetermined time period may be shortened. In the case where, for example, the controller 62 is activated during the day, when it is not necessarily desirable to turn on the headlight 2 quickly, the predetermined time period may be extended. In this manner, the control of the headlight 2 to be on or off is started at an appropriate time.

Figure 10:
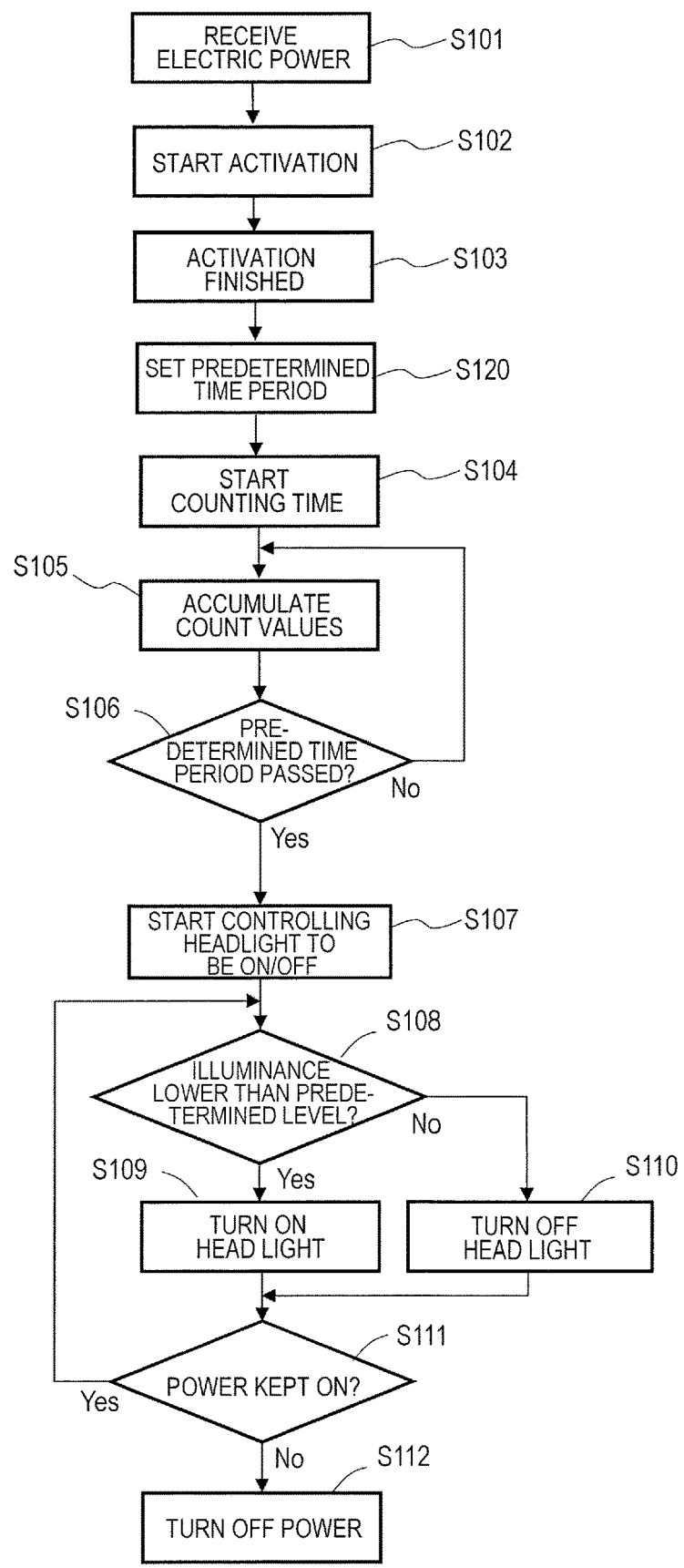
FIG. 10 is a flowchart showing a modification of the operation of the controller controlling the headlight to be on or off in a preferred embodiment of the present invention.

FIG. 10 is a flowchart showing an operation of the controller 62 controlling the headlight 2 to be on or off using the illuminance sensor 63. In the operation shown in FIG. 10, the controller 62 is configured or programmed to change the length of the predetermined time period. The processes in steps S101 through S103 are the same as the processes described above with reference to FIG. 9.

The activated controller 62 sets the length of the predetermined time period in accordance with the time of activation of the controller 62. In the case where, for example, the time of activation of the controller 62 is in a time slot from 4:00 p.m. to 7:59 a.m., the predetermined time period is set to about 1.0 second, for example. In the case where, for example, the time of activation of the controller 62 is in a time slot from 8:00 a.m. to 3:59 p.m., the predetermined time period is set to about 2.0 seconds, for example.

Upon setting the length of the predetermined time period, the controller 62 starts counting time using the counter 78 (step S104). The processes in steps S104 through S112 are the same as the processes described above with reference to FIG. 9 except for the length of the predetermined time period, and thus will not be described here.

The operation panel 60 may include a function of a radio clock. In this case, the accuracy of time is improved, and thus the length of the predetermined time period is set with higher precision.

In the case where the controller 62 counts dates in addition to the time, the length of the predetermined time period may be changed also in consideration of the date. The sunshine duration changes in accordance with the season. The sunshine duration is short in the winter and long in the summer.

In the case where the date is, for example, between June 1 to September 30, a time slot defined as the daytime is extended and a time slot defined as the night time is shortened. In the case where, for example, the time of activation of the controller 62 is in a time slot from 5:00 p.m. to 6:59 a.m., the length of the predetermined time period is set to about 1.0 second, for example. In the case where, for example, the time of activation of the controller 62 is in a time slot from 7:00 a.m. to 4:59 p.m., the length of the predetermined time period is set to about 2.0 seconds, for example. By contrast, in the case where the date is between, for example, October 1 to May 31, a time slot defined as the daytime is shortened and a time slot defined as the night time is extended. In the case where, for example, the time of activation of the controller 62 is in a time slot from 4:00 p.m. to 7:59 a.m., the length of the predetermined time period is set to about 1.0 second, for example. In the case where, for example, the time of activation of the controller 62 is in a time slot from 8:00 a.m. to 3:59 p.m., the length of the predetermined time period is set to about 2.0 seconds, for example. In this manner, the control of the headlight 2 to be on or off is started at an appropriate time in accordance with the season.

In the case where the power button 70 is kept on when the controller 62 finishes the activation process after the rider presses the power button 70, the predetermined time period does not need to be counted. The time period required to move a finger away after the finger presses the power button 70 varies in accordance with the individual rider. In the case where the finger keeps on pressing the power button 70 even after the controller 62 is activated, the finger may possibly block the light advancing toward the illuminance sensor 63 when the controller 62 starts controlling the headlight 2 to be on or off. Therefore, the control of the headlight 2 to be on or off is started after a predetermined time period passes after the power button 70 is released from being pressed. In this manner, the headlight 2 is significantly reduced or prevented from being turned on due to the light advancing toward the illuminance sensor 63 being blocked by the finger.

Figure 11:
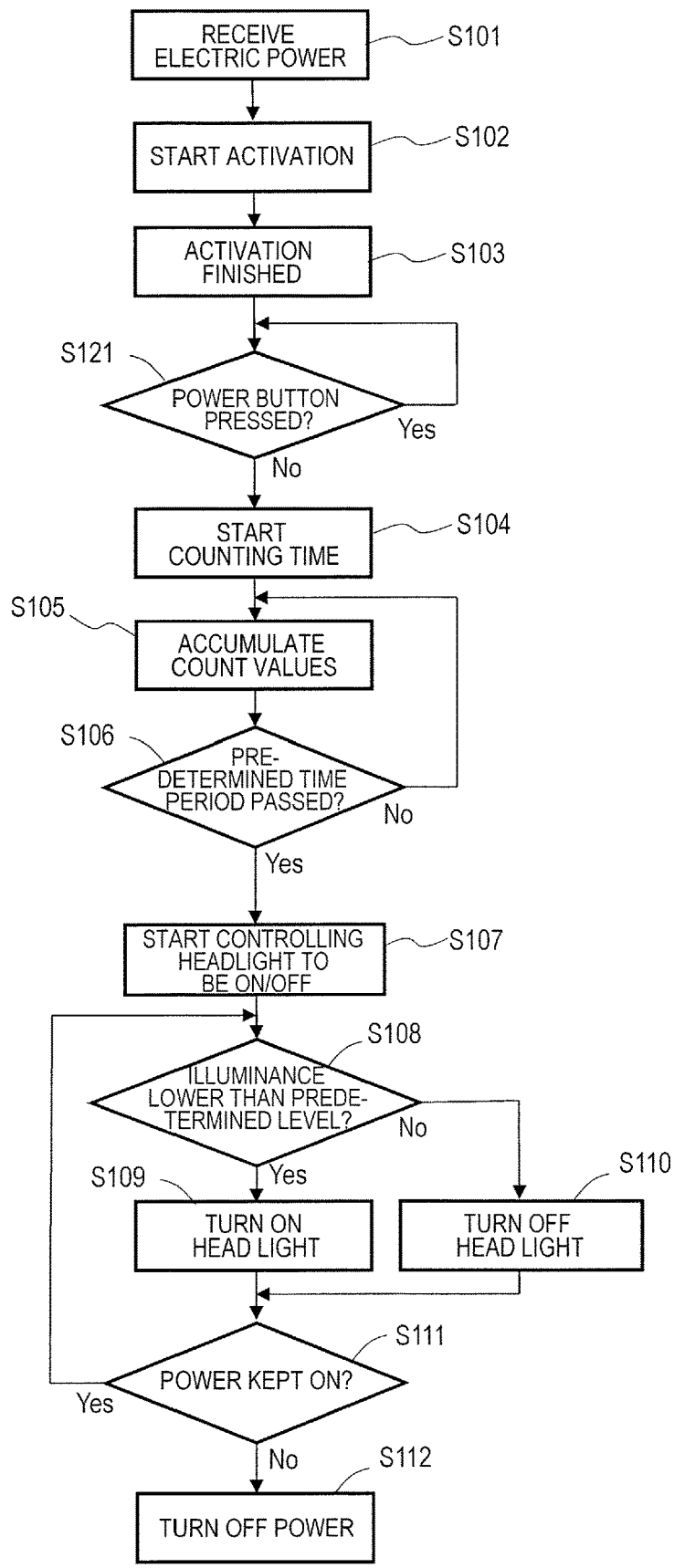
FIG. 11 is a flowchart showing another modification of the operation of the controller controlling the headlight to be on or off in a preferred embodiment of the present invention.

FIG. 11 is a flowchart showing an operation of the controller 62 controlling the headlight 2 to be on or off using the illuminance sensor 63. In the operation shown in FIG. 11, the controller 62 does not start counting the predetermined time period while the power button 70 is pressed. The processes in steps S101 through S103 shown in FIG. 11 are the same as the processes described above with reference to FIG. 9.

The activated controller 62 determines whether or not the power button 70 is pressed (step S121). When determining that the power button 70 is pressed, the controller 62 does not start counting the predetermined time period. When determining that the power button 70 is not pressed, the operation advances to the process in step S104, where the controller 62 starts counting the predetermined time period. The processes in steps S104 through S112 are the same as the processes described above with reference to FIG. 9, and thus will not be described here.

In the case where the power button 70 is kept pressed, the controller 62 starts controlling the headlight 2 to be on or off after a predetermined time period passes after the power button 70 is released from the press. In this manner, the headlight 2 is significantly reduced or prevented from being turned on due to the light advancing toward the illuminance sensor 63 being blocked by the finger.

There may be a type of electrically power assisted bicycle 1 that includes a power lock function, by which the power button 70 is long-pressed to invalidate the operation made on the power button 70. In the case where the rider keeps on pressing the power button 70 in an attempt to put the electrically power assisted bicycle 1 into a power lock mode, the finger may possibly block the light advancing toward the illuminance sensor 63 when the controller 62 starts controlling the headlight 2 to be on or off. Therefore, the controller 62 starts controlling the headlight 2 to be on or off after a predetermined time period passes after the power button 70 is released from being pressed. In this manner, the headlight 2 is significantly reduced or prevented from being turned on due to the light advancing toward the illuminance sensor 63 being blocked by the finger.

In the above described preferred embodiments, the two-wheel electrically power assisted bicycle is described as an example of the electrically power assisted bicycle. The present invention is not limited to this. For example, the electrically power assisted bicycle may have three or more wheels.

In the above described preferred embodiments, the driving wheel to which the human power generated by the rider pressing the pedals and the assist power generated by the electric motor are transmitted is the rear wheel. The present invention is not limited to this. Depending on the configuration of the electrically power assisted bicycle, the human power and the assist power may be transmitted to the front wheel or both of the front wheel and the rear wheel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrically power assisted bicycle comprising:
   an electric motor that generates an assist force to assist human power of a rider;
   a battery that supplies electric power to the electric motor;
   a headlight; and
   an operation panel including a display that displays information, a power button that turns on or off the electrically power assisted bicycle, an optical sensor that outputs a signal in accordance with received light, and a controller configured or programmed to control the headlight to be on or off; wherein
   the power button and the optical sensor are located adjacent to each other on or in the operation panel; and
   the controller is configured or programmed to start controlling the headlight to be on or off in accordance with the signal output by the optical sensor after the controller counts for a predetermined time period after the controller is activated by the power button being pressed by the rider and the controller is put into a state of accepting operations from an assist force setting button that sets the assist force of the electric motor.

2. The electrically power assisted bicycle according to claim 1, wherein the predetermined time period is about 1 second or longer and shorter than about 3 seconds.

3. The electrically power assisted bicycle according to claim 1, wherein the predetermined time period is about 1.5 seconds.

4. The electrically power assisted bicycle according to claim 1, wherein the operation panel includes a clock; and
   the controller is configured or programmed to change a length of the predetermined time period in accordance with a time of activating the controller.

5. The electrically power assisted bicycle according to claim 1, wherein the operation panel includes a clock; and
   the controller is configured or programmed to change a length of the predetermined time period in accordance with a time slot including a time of activating the controller.

6. The electrically power assisted bicycle according to claim 4, wherein the controller is configured or programmed to calculate dates; and
   the controller is configured or programmed to change a length of the predetermined time period in accordance with a date when the controller is activated.

7. The electrically power assisted bicycle according to claim 1, wherein, when the power button is kept on when the controller is activated by the power button being pressed by the rider and after the predetermined time period passes after the power button is released from being pressed, the controller is configured or programmed to start controlling the headlight to be on or off in accordance with the signal output by the optical sensor.

8. The electrically power assisted bicycle according to claim 1, further comprising a handle including a left grip and a right grip to be held by a rider; wherein
   the operation panel is located to the left of the handle;
   the operation panel further includes:
   the assist force setting button that sets the assist force of the electric motor;
   a switch button that switches information on a running state of the electrically power assisted bicycle to be displayed on the display; and
   a light button that turns on or off the headlight; and
   the assist force setting button, the switch button, the light button, the power button, and the optical sensor are located on or in the operation panel, in this order, from a position closer to the left grip to a position farther away from the left grip.

9. The electrically power assisted bicycle according to claim 8, wherein the operation panel further includes a single printed circuit board; and the display, the assist force setting button, the switch button, the light button, the power button, the optical sensor, and the controller are located on the single printed circuit board.

10. The electrically power assisted bicycle according to claim 1, wherein the predetermined time period occurs before the controller uses the signal output by the optical sensor to start controlling the headlight.

* * * * *